March 3, 1936.    C. HUSSMAN    2,032,659
ANTIVIBRATION MACHINE BASE
Filed Nov. 27, 1933    2 Sheets-Sheet 1
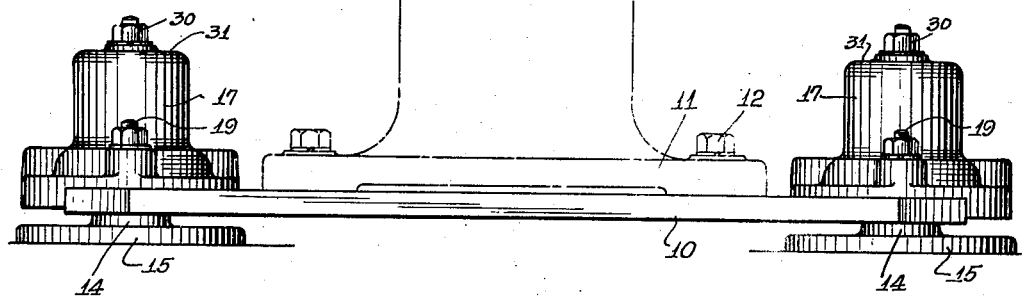
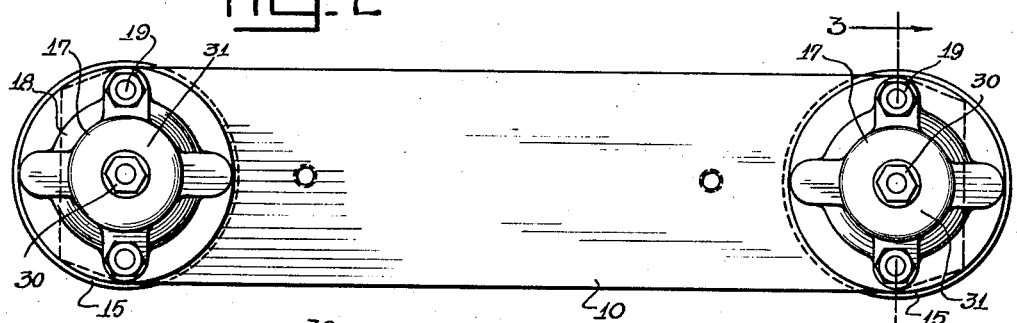
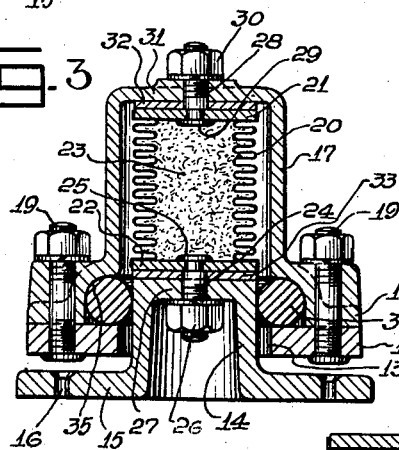
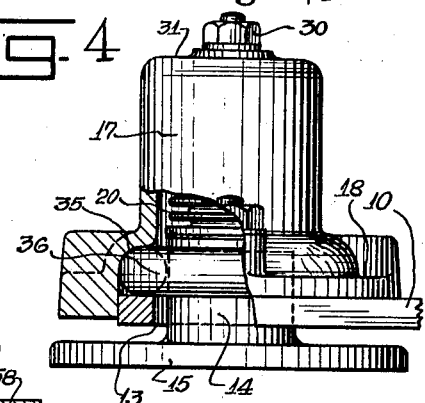
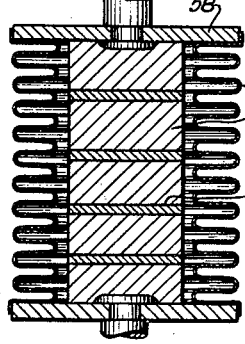
INVENTOR
CARL HUSSMAN.
BY
ATTORNEY March 3, 1936.                C. HUSSMAN                 2,032,659
                      ANTIVIBRATION MACHINE BASE
                        Filed Nov. 27, 1933            2 Sheets-Sheet 2
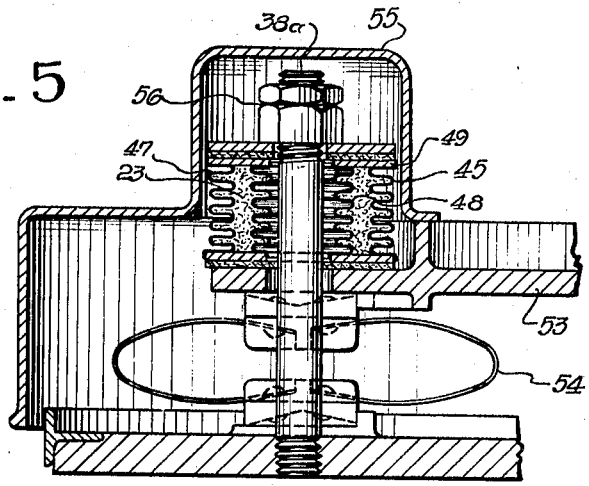
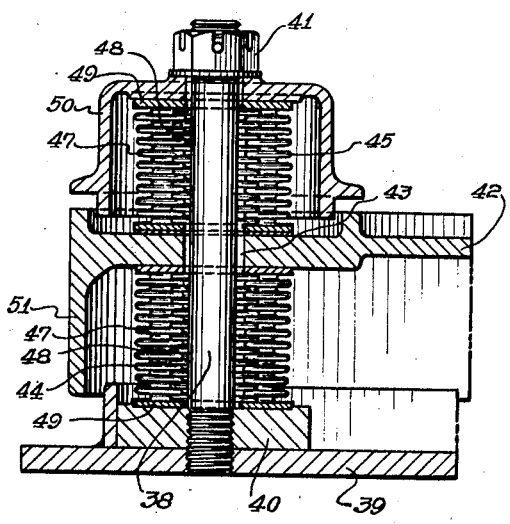
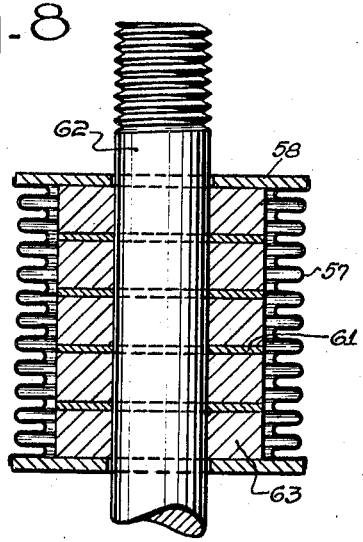
INVENTOR
CARL HUSSMAN.
BY
ATTORNEY Patented Mar. 3, 1936

2,032,659

UNITED STATES PATENT OFFICE 2,032,659

ANTIVIBRATION MACHINE BASE

Carl Hussman, Chicago, Ill., assignor to United States Gypsum Company, Chicago, Ill., a corporation of Illinois Application November 27, 1933, Serial No. 699,862

6 Claims. (Cl. 248—21)

This invention relates to machine bases, and has reference more particularly to means for preventing the transfer of vibrations from moving machinery to the supporting structure, and for preventing undue vibration of the machine itself.

Heretofore it has been proposed to employ metallic springs of various types in connection with machine bases to absorb the vibrations imparted by moving machinery and prevent transmission of the vibrations to the structure forming the support for the machine base. In these constructions it has been customary to provide a relatively massive structure to obtain the desired results. Moreover, it has been a problem to prevent undesirable swaying or rocking of the machine mounted on the base.

To meet these and other problems, my improved machinery base comprises resilient units embodying the use of flexible metallic diaphragms containing resilient material for the absorption of vibration. These units may be inserted under the base or platform on which the moving machine is supported, but they may also be used as snubbers above the machine supporting platform to prevent undue rocking of the base when the machine might be caused to sway, such as when it has massive moving parts where desired, the units may also be used to advantage in conjunction with resilient springs.

An object of my invention, therefore, is to provide means for preventing the transmission of vibratory movement of active machinery to the structure upon which the weight of said machinery is supported.

Another object is to provide means for the prevention of rocking and undue vibration in the machine base itself.

Another object of the invention is to provide a resilient machinery base in which there are used resilient units comprising one or more flexible diaphragm means, preferably filled with a resilient material.

Another object of the invention resides in the provision of means self-sufficient to absorb the vibrations of active machinery without the use of the customary metallic spring means heretofore employed, but which may be used in conjunction with such spring means.

Another object of the invention is to provide a resilient unit which may be used either under the machine supporting platform or as a snubber, or both; also to improve resilient machinery bases in other respects hereinafter specified and claimed.

Reference is to be had to the accompanying drawings forming a part of this specification, in which Fig. 1 is an elevation of a preferred form of my improved machinery base;

Fig. 2 is a plan view of the base shown in Fig. 1;

Fig. 3 is a sectional elevation through one of the resilient units taken on line 3—3 of Fig. 2;

Fig. 4 is an elevation of one of the resilient units with parts broken away to disclose the construction;

Fig. 5 is a fragmentary, sectional elevation of a modified form of machine base with one of the resilient units employed as a snubber in conjunction with flat spring clips supporting the machinery platform;

Fig. 6 is a sectional elevation through a machinery base in which one of my diaphragm type of resilient units is used both as a snubber and as a support for the machine platform;

Fig. 7 is a sectional elevation through a modified form of resilient unit; and

Fig. 8 is a sectional elevation through a further modified form of resilient unit.

In practicing my invention, I may provide a platform 10, upon which a machine 11, is secured by means of bolts 12. Adjacent each corner or end of the platform 10, I provide an opening 13 (Fig. 3) into which extends a cup-shaped casting 14 having a base 15 which may be secured to the floor or other support by any suitable means, such as screws, passing through suitable apertures 16. A cup-shaped diaphragm cover 17 is mounted over the cup-shaped member 14 and is provided with an outstanding annular flange 18 which is secured to the platform 10 by bolts 19. A resilient unit is mounted within the cup 17 and preferably comprises a resilient metal diaphragm or bellows 20 which has annular corrugations to permit axial movement of said diaphragm. The ends of said bellows are sealed, as by soldering, about an upper metallic disc 21 and a lower metallic disc 22, so as to make a hermetically sealed space within the bellows which is preferably filled with a resilient material 23. The material 23 may be air, under pressure, but preferably consists of a material such as a mixture of 60 per cent paraffine oil and 40 per cent rosin which has properties particularly suitable for the present purpose. For extremely heavy duty the bellows are packed with steel wool of about 0.1 mm. thickness of fibre, the top disc 21 is sealed in, and then the voids in the steel wool are filled with the paraffine oil and rosin mixture by means of a pressure gun screwed into an opening, not shown, provided in disc 21 for this purpose. The material 23 may also be rubber, various solids, liquids, and various mixtures of solids and liquids. In order to secure the resilient unit in the cup 17, a bolt 24 has its head 25 sealed to the disc 22, and is provided with a nut 26 which secures the bolt in place in the upper end 27 of the cup shaped member 14. A similar bolt 28 has head 29 sealed to the disc 21 and is provided with a nut 30 which secures the bolt 28 in position on head 31 of cup 17. A washer 32, of lead or other suitable material is preferably interposed between disc 21 and the inner face of head 31 of cup 17. A similar washer 33 is preferably interposed between disc 22 and top 27 of cup 14. An annular groove 35 is formed adjacent the flange 18 and is adapted to receive a resilient rubber ring 36 which serves to prevent side movement of the platform 10 under the influence of the vibrating machine 11, thus limiting the movement of the platform 10 to a vertical direction.

For some purposes, I find it desirable to pass a bolt down through the center of the resilient unit. An example of this is shown in Fig. 6 in which bolt 38 is screwed into base 39 and washer 40 at the lower end of said bolt, and the upper end of said bolt is provided with a nut 41. Machine platform 42 has an opening 43 through which bolt 38 passes. Resilient units 44 of the bellows type are provided for supporting the platform 42 and similar units 45 are provided above the platform 42 to act as snubbers and to prevent undue rocking of the platform 42. The units 44 and 45 comprise an outer bellows diaphragm 47 and an inner bellows diaphragm 48 which are sealed together at their ends about metal rings 49. A cup 50 extends over the snubber unit 45 to keep out dust and dirt, and an annular flange 51 extends downwardly from the platform 42 for the same purpose. The space between the bellows 47 and 48 is filled with resilient material 23 as previously described. The compression to which units 44 and 45 are to be subjected in order to control vibration and prevent oscillation may be regulated by tightening nut 41 on bolt 38.

In the form of machinery base shown in Fig. 5, the bellows type of resilient unit 45 is used as a snubber above a machine platform 53, which is supported by a plurality of flat springs 54 arranged in pairs and more specifically described in my copending application, Serial Number 699,-861, filed November 27, 1933. A suitable pressed metal cover 55 is provided over the resilient unit 45 and springs 54, in order to protect the same from damage and to keep out dust and dirt. By placing a snubber unit as described at each corner, for example, of a machine base, rocking of the base as well as undesirable oscillation of the base will be controlled. A bolt 38a functions substantially like bolt 38, hereinabove described, and is provided with a lock nut assembly 56 for regulating the compression to which unit 45 is to be subjected for most effective results under the circumstances.

In the form of resilient unit shown in Fig. 7, a metallic bellows 57 is sealed at each end about metal discs 58, each said disc having a bolt 59 sealed into the center thereof. A plurality of resilient discs 60, preferably of rubber, or the like, are provided inside the bellows diaphragm 57, said discs 60 being preferably separated by discs of lead 61 which aid in preventing deflection of the column of discs 60 laterally of the axis thereof. In this form of resilient unit, the bellows diaphragm 57 serves to keep out air, oil, grease, or the like, from the rubber discs 60, thus preventing oxidation and deterioration of the rubber. If desired, a bolt 62 (Fig. 8) may pass through the resilient unit. In this case, resilient rings 63 have an internal diameter preferably slightly less than the diameter of the bolt 62, so as to tightly fix said bolt and prevent the access of air to the rubber which would otherwise cause its oxidation and deterioration. Some space is preferably permitted to remain between the walls of bellows 57 and the periphery of discs 60 or rings 63 so as to accommodate lateral expansion of these resilient members under compression.

From the foregoing description it will be apparent that the present invention is adaptable to a variety of machine base constructions, of which several examples have been specifically disclosed. The type of machine base structure shown in Fig. 1, for example, is of very simple construction and well suited for conditions in which it is desirable to reduce the distance between the floor and machine itself to a minimum while still obtaining the desired vibration control. More massive forms of machine base such as those shown in Figs. 5 and 6 are also provided for.

I would state in conclusion that while the illustrated examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. In a resilient machinery base, a platform for supporting a moving machine, said platform being provided with a plurality of peripheral openings, seats having outstanding shoulders extending through said openings, cup-shaped brackets on said platform and extending over said shoulders, a bellows type of metallic diaphragm in each of said brackets and supported on said shoulders, resilient material within each of said diaphragms, and a spacer ring of resilient material between said cup and shoulders.

2. A resilient element for use in anti-vibration machinery bases, comprising a bellows type of metal diaphragm, a metallic washer ring sealed into each end of said diaphragm, a bolt passing through each of said rings, and stacked rings of resilient material within said diaphragm and tightly embracing said bolt to substantially prevent the access of air to said resilient rings.

3. A resilient element for use in anti-vibration machinery bases, comprising a pair of bellows type of cylindrical metal diaphragms of different diameters and concentrically arranged, means for sealing together the ends of said diaphragms to form a closed space, and plastic material completely filling said space and serving to support said machinery.

4. A resilient element for use in anti-vibration machinery bases, comprising a pair of bellows type of cylindrical metal diaphragms of different diameters and concentrically arranged, a disc-like ring sealed into each end of said diaphragms to form a closed space, and a plastic material completely filling said space and serving to support said machinery.

5. A resilient unit for the purpose described, comprising a pair of bellows type of cylindrical metal diaphragms of different diameters concentrically arranged, means for sealing together the ends of said diaphragms to form a closed space, and a substantially resilient material completely filling said space.

6. A resilient element for use in anti-vibration machinery bases, comprising a bellows type of metal diaphragm, means for sealing the ends of said diaphragm, a resilient material of a semi-solid nature completely filling the space within said diaphragm so as to resiliently limit the contraction of said diaphragm, and means associated with the ends of said diaphragm for connecting the same to supporting structures.

CARL HUSSMAN.